UNITED STATES PATENT OFFICE.

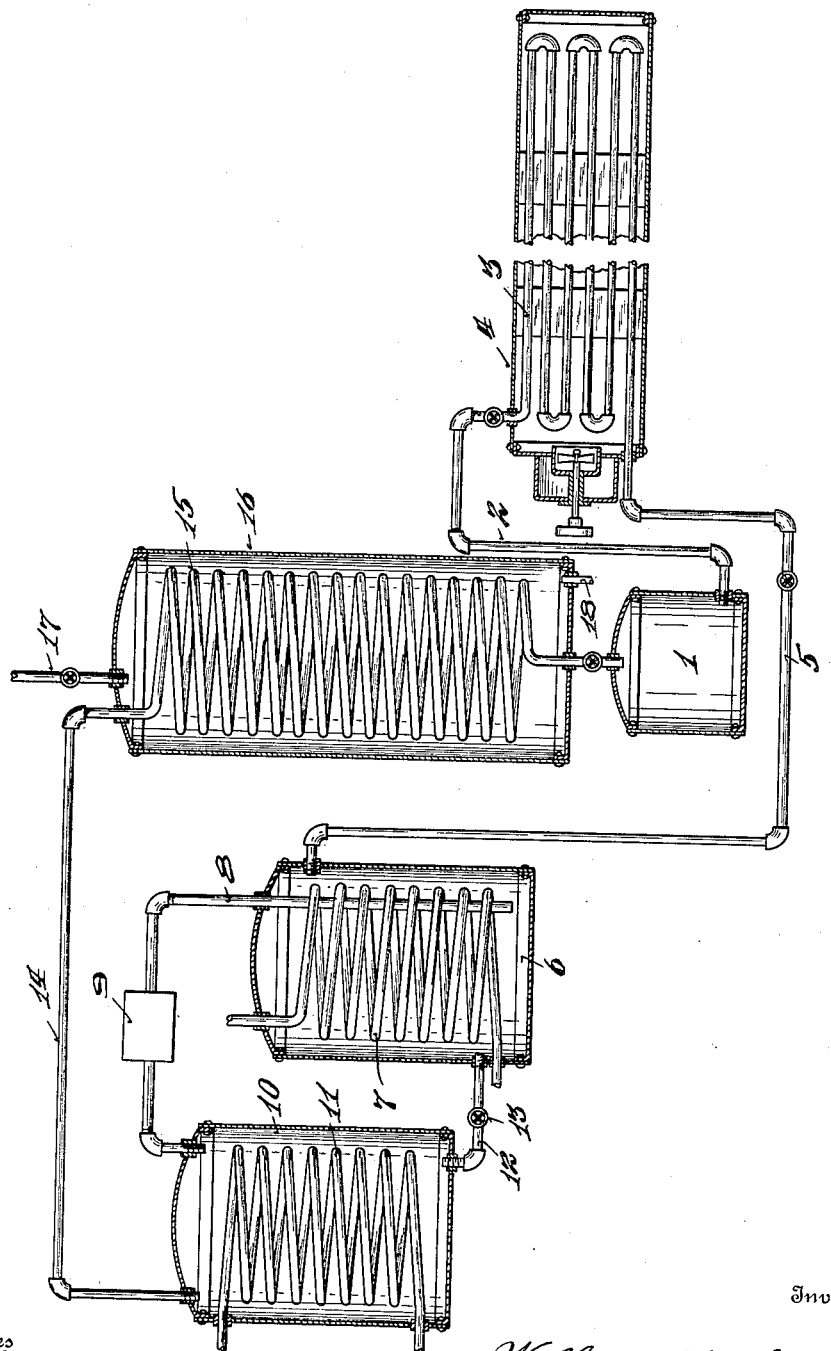

WILLIAM W. SEAY, OF CINCINNATI, OHIO.

PROCESS OF REFRIGERATION.

1,042,041.  Specification of Letters Patent.  Patented Oct. 22, 1912.

Application filed April 22, 1909, Serial No. 491,450. Renewed February 26, 1912. Serial No. 680,111.

*To all whom it may concern:*

Be it known that I, WILLIAM W. SEAY, a citizen of the United States, residing at Cincinnati, in the county of Hamilton and State of Ohio, have invented certain new and useful Improvements in Processes of Refrigeration, of which the following is a specification.

My invention relates to a process in the art of refrigeration, and more particularly to a modification of the process described and claimed in my former application for a patent originally filed March 28, 1905, Serial No. 252,571, and renewed November 13, 1907, Serial No. 401,987.

The process herein described involves the basic principles of the original application and hinges upon the same discovery, but is directed to a different commercial method of utilizing the invention.

Briefly speaking, in my original application I disclosed the process in which a solid absorbent salt is used, such as the nitrate of ammonium, or, the thiocyanate of ammonium, there being several other equivalent salts which I need not name. These salts have the property of going from a solid state into a liquid solution with a refrigerant gas, such as ammonia gas.

In the original application, I preferably absorb the expanded gas into a solid absorbent and then apply heat, volatilize off the refrigerant gas and reconvert the salt into a solid state. This process utilizes the full thermal efficiency and is the preferable process where this element is the controlling factor.

In this modified process, I do not entirely eliminate the ammonia from the absorbing solution during the generating step so as to technically resolidify the original salt but stop short of this point while the salt and the residue of the ammonia still exist as a liquid solution.

I have discovered that after the nitrate of ammonium, say, has had added to it just sufficient ammonia gas to form a liquid solution, the solution itself shows a marked absorbing affinity for ammonia gas. Therefore, this modified process lends itself to any commercial conditions in which it may be desirable to manipulate the absorbent in a liquid condition somewhat analogous to the ordinary absorption process. However, unlike the ordinary absorption process, the application of heat to the absorbent solution in my process volatilizes off the ammonia and resolidifies the salt if carried far enough, so that the process is in the direction of vaporizing the ammonia and solidifying the nonvolatile absorbent, thus insuring the separation of the ammonia as an anhydrous vapor. The salt being anhydrous the ammonia will be anhydrous.

I have shown in the drawing, a diagrammatic form of apparatus, illustrating this modified process.

1 is the reservoir for the liquid ammonia. It passes through pipe 2 into the expanding coil 3 in the refrigerator 4, performing the ordinary refrigerating act. When expanded it passes through pipe 5, into the absorber tank 6, in which the absorbent salt, preferably nitrate of ammonia, is placed, either in a solid state or in the form of a liquid solution, having the property of absorbing ammonia gas. In tank 6 is the coil 7, through which cooling water is circulated to carry off heat of liquefaction. The ammonia gas is absorbed into this solution of nitrate of ammonia and is pumped out through pipe 8, by pump 9, into the generating or vaporizing tank 10.

11 is a coil in this tank 10 for circulating hot water or steam and vaporizing the refrigerant from the solution of the salt. As the gas passes out of the solution the liquid is reduced in volume and is increased in density, gradually assuming a pasty consistency, although still having sufficient mobility to manipulate as a fluid. This weakened solution passes out of the tank 10, into the pipe 12, back into the tank 6 for the reabsorption, by reason of the higher pressure maintained in tank 10 over that in tank 6, the refrigerant gas volatilized in tank 10 is separated by flowing out through pipe 14, into the condensing coil 15, within the condenser 16, returning in a liquid state into the reservoir 1. Cold water is circulated in the usual way through tank 16, by inlet and exit pipes 17, 18. This flow from tank 10 is controlled by an adjusting cock 13. Tank 10 being constantly generating or volatilizing, is under a high condensing pressure, whereas the absorption is done at a lower pressure, (to-wit, that of the expansion coil) rarely exceeding forty-four pounds absolute pressure per square inch, hence you have only to open cock 13 and the solution will flow into tank 10.

This describes a complete cycle of operation in a continuous process. It is quite evident that this process might be intermittently carried on and a single tank used alternately as a generator and an absorber.

When the absorbent salt has been converted from a solid state to a liquid solution with the refrigerant gas, upon the application of heat to the absorbent solution, a portion of the ammonia gas will be rapidly volatilized off and the remainder less easily. This being particularly true if the solution formed by the solid salt and ammonia gas is further utilized to absorb an additional volume of refrigerant gas. It is therefore evident that this process is in some respects more expeditious than the process described in my prior application, in that the extra time required to completely resolidify the absorbent salt from its solution need not be consumed, but just sufficient ammonia volatilized from the solution to constitute an efficient working volume of the refrigerant, and the weakened but not entirely exhausted liquid can then be immediately reëmployed in a succeeding absorbing step.

Having described my invention, I claim:—

1. In the art of refrigeration, the process of absorbing expanded refrigerant gas into a liquid formed from a salt having the property of going from a solid state into liquid solution with said gas, subjecting the solution to the influence of a cooling medium during the absorption period, heating the solution and volatilizing refrigerant gas therefrom, condensing the separated refrigerant gas, expanding the condensed refrigerant in the zone of the article to be cooled and reabsorbing the expanded refrigerant gas into said liquid solution of the absorbent salt, substantially as described.

2. In the art of refrigeration, the process of absorbing expanded refrigerant gas into a liquid formed from a salt having the property of going from a solid state into liquid solution with said gas, subjecting the solution to the influence of a cooling medium during the absorbing period in one tank, removing the absorbing solution into another tank and heating the solution therein, volatilizing off refrigerant gas from said solution, condensing the separated refrigerant gas in another compartment, expanding the condensed refrigerant in the zone of the article to be cooled, returning the weakened salt solution to the first-named absorbent tank and again reabsorbing the expanded refrigerant gas into said solution, substantially as described.

3. In the art of refrigeration, the process of absorbing the refrigerant gas into a salt having the property of going from a solid state into a liquid solution with said gas, reducing the temperature during the absorbing period, raising the temperature and vaporizing refrigerant gas from said liquid solution and absorbing another charge of refrigerant gas into a solution formed by said salt and gas, substantially as described.

4. In the art of refrigeration, the process of absorbing in one tank refrigerant gas into a solution formed by said gas and a salt having the property of going from a solid into a liquid state with said gas, and volatilizing refrigerant gas from its absorbent solution in another tank, substantially as described.

5. The herein described process of refrigeration which consists in applying heat to a dilute liquid solution of anhydrous ammonia and a salt whereby to separate and drive off a part of the ammonia while maintaining the salt in solution, condensing the gas to produce liquid anhydrous ammonia, then expanding said gas to produce cold, then absorbing said gas in a portion of the original liquid whereby it is enriched, and repeating the process, substantially as described.

6. The herein described process of refrigeration which consists in applying heat to a dilute liquid solution of anhydrous ammonia and a salt in a container, whereby to drive off a portion of the ammonia, condensing the ammonia gas to form liquid anhydrous ammonia, expanding the gas to produce cold and then re-absorbing said gas in a portion of the residual liquor in a separate vessel and at a lower pressure and temperature, and returning the enriched liquor to the original container or generator, substantially as described.

In testimony whereof, I have hereunto set my hand.

WILLIAM W. SEAY.

Witnesses:
OLIVER B. KAISER,
EMMA SPENER.